United States Patent
Wang et al.

(10) Patent No.: US 11,500,339 B2
(45) Date of Patent: Nov. 15, 2022

(54) DYNAMIC POSITIONING AND THRUST DISTRIBUTION DEVICE AND METHOD BASED ON ARTIFICIAL NEURAL NETWORK

(71) Applicant: SHANGHAI JIAO TONG UNIVERSITY, Shanghai (CN)

(72) Inventors: Lei Wang, Shanghai (CN); Bo Li, Shanghai (CN); Fan Yi, Shanghai (CN); Xuefeng Wang, Shanghai (CN); Huacheng He, Shanghai (CN); Licheng Qin, Shanghai (CN)

(73) Assignee: SHANGHAI JIAO TONG UNIVERSITY, Shanghai (CN)

( * ) Notice: Subject to any disclaimer, the term of this patent is extended or adjusted under 35 U.S.C. 154(b) by 432 days.

(21) Appl. No.: 16/764,665

(22) PCT Filed: Dec. 23, 2019

(86) PCT No.: PCT/CN2019/127352
§ 371 (c)(1),
(2) Date: May 15, 2020

(87) PCT Pub. No.: WO2020/135312
PCT Pub. Date: Jul. 2, 2020

(65) Prior Publication Data
US 2021/0223747 A1 Jul. 22, 2021

(30) Foreign Application Priority Data
Dec. 26, 2018 (CN) .......................... 201811597787.9

(51) Int. Cl.
*G05B 13/02* (2006.01)
*G06N 3/04* (2006.01)
*G06N 3/08* (2006.01)

(52) U.S. Cl.
CPC ............. *G05B 13/027* (2013.01); *G06N 3/04* (2013.01); *G06N 3/084* (2013.01)

(58) Field of Classification Search
CPC ...... G05B 13/027; G05B 13/042; G06N 3/04; G06N 3/084
See application file for complete search history.

(56) References Cited

U.S. PATENT DOCUMENTS

| | | | |
|---|---|---|---|
| 6,317,658 B1 | 11/2001 | Vian | |
| 11,435,722 | * 9/2022 | Moreno | ............. G05B 19/4155 |

(Continued)

FOREIGN PATENT DOCUMENTS

| | | | |
|---|---|---|---|
| CN | 102508431 A | | 6/2012 |
| CN | 106200384 A | * | 12/2016 |

(Continued)

OTHER PUBLICATIONS

Zhang: Research on Multi-Step Thrust Allocation Optimization Algorithm of Vessels: A dissertation . . . : School of Electronics and Electric Engineering, Shanghai Jiao Tong University, Jan. 2015.

(Continued)

*Primary Examiner* — Charles T Shedrick
(74) *Attorney, Agent, or Firm* — Leason Ellis LLP (57) ABSTRACT

The invention provides a dynamic positioning and thrust distribution method based on an artificial neural network, is a quadratic programming problem in the optimization problem, and can compute the thrust coefficient of a rear thruster in a constraint condition of a thrust distribution problem by taking into account of the corner of a front thruster and through the artificial neural network. Then the optimization problem enabling the power of the thruster to be minimized is solved according to a sequential quadratic programming algorithm, so that a thrust distribution scheme on the azimuth thrusters is obtained. Meanwhile the invention further (Continued)

provides a dynamic positioning and thrust distribution device based on an artificial neural network. The invention, through the introduction of the concept of thrust coefficients, on the one hand, can accurately quantize thrust loss, and on the other hand can enlarge the feasible area of the rotation angle of the thruster, thereby ensuring that the more optimized and reasonable result can be obtained for the quadratic programming problem, reducing the power of the thruster and saving energy.

6 Claims, 4 Drawing Sheets

(56) References Cited

U.S. PATENT DOCUMENTS

| | | | |
|---|---|---|---|
| 2021/0223747 A1* | 7/2021 | Wang | G06N 3/04 |
| 2022/0269401 A1* | 8/2022 | Lekivetz | G01N 3/02 |

FOREIGN PATENT DOCUMENTS

| | | | | |
|---|---|---|---|---|
| CN | 107992648 A | | 5/2018 | |
| CN | 108333925 A | * | 7/2018 | |
| CN | 108333925 A | | 7/2018 | |
| CN | 109683479 A | | 4/2019 | |
| CN | 112506060 A | * | 3/2021 | ........... G05B 13/042 |
| CN | 112379591 B | * | 5/2022 | ........... G05B 13/042 |
| JP | 2002173086 A | | 6/2002 | |
| WO | WO-2020135312 A1 | * | 7/2020 | ........... G05B 13/027 |

OTHER PUBLICATIONS

Zhu: Research on the Thrust Allocation for Dynamic Positioning System: A Thesis . . . : Jiangsu University of Science and Technology, Mar. 2015.

International Search Report and Written Opinion in PCT/CN2019/127352, dated Mar. 27, 2020.

* cited by examiner

Prohibited angle area

DYNAMIC POSITIONING AND THRUST DISTRIBUTION DEVICE AND METHOD BASED ON ARTIFICIAL NEURAL NETWORK

BACKGROUND OF THE INVENTION

Technical Field

The invention relates to a thrust distribution technology of a dynamic positioning system for an offshore structure, in particular to a dynamic positioning and thrust distribution device and method of an offshore structure, based on an artificial neural network for computing thrust loss.

Description of Related Art

With gradual enlargement of development scale of ocean resources by human being, the development of positioning systems of offshore structures operated in severe sea conditions has become one of the important topics in research and development of high-tech equipment in offshore engineering. A dynamic positioning system is a control system utilizing a thruster of ship or offshore platform to keep the ship or offshore platform in a required position on a sea level as accurate as possible. The dynamic positioning system has the advantages that the system is simple to operate, and generally the positioning accuracy is not affected by water depth, and the system has been widely applied to deepwater semi-submersible drilling platforms. Generally, the dynamic positioning system comprises a position measurement system, a control system and a thrust system. The measurement system obtains real-time position information of structures through satellites or underwater acoustic arrays. The control system computes total thrust or torque required for enabling an offshore structure to return a target position through deviation between the actual position and target position of the offshore structure. The thrust system distributes thrust for all thrusters, further ensures that all the thrusters produce total thrust or torque required for the positioning of the offshore structure, and finally realizes dynamic positioning of the offshore structure through the thrusters.

Essentially, power distribution is a nonlinear optimization problem, and a power distribution method requires that the total power of all the thrusters is minimized while ensuring that the resultant force of all the thrusters is equal to the total thrust and torque required for the positioning of the offshore structure.

In the power distribution problem, a key factor required to be considered is a water power interference problem among azimuth thrusters. For semi-submersible drilling platforms, if two azimuth thrusters which are in series connection are adopted, the tail flow of the front thruster can affect the rear thruster, to cause the fact that the actual thrust produced by the rear thruster is smaller than the theoretical thrust, and the phenomenon is called as thrust loss. Thrust loss can cause severe energy waste of the semi-submersible drilling platforms. In the prior art, in order to avoid thrust loss, a prohibited area can be provided for the rotation angle of the front thruster, and the corner of the front thruster cannot be kept in the prohibited angle area to prevent the tail flow from affecting the rear thruster. However, as the prohibited angle exists, the thruster cannot penetrate through the prohibited angle during rotation, so that the problem that the corner of the thruster is clamped at the edge of the prohibited angle. Optimization of power distribution cannot be obtained, minimization of the total power of the thruster cannot be realized, and energy waste is caused.

BRIEF SUMMARY OF THE INVENTION

Aiming at the aforementioned deficiencies in the prior art, the invention aims at providing a dynamic positioning and thrust distribution device and method based on an artificial neural network. The device and method avoid thrust loss caused by water power interference in a power distribution problem, meanwhile cancel a prohibited angle, solves the problem that the corner of a thruster is clamped, ensures that the total power of the thruster is reduced, and saves energy.

The invention is realized through the following technical scheme.

According to one aspect of the invention, a dynamic positioning and thrust distribution method, based on an artificial neural network, is provided, and comprises the following steps:

Step S1: Establish and train a fitting thrust coefficient of an artificial neural network in a real-time control computer.

Wherein:

The established artificial neural network comprises an input layer, hidden layers and an output layer. An input vector is x=[α], with α as the corner of a front thruster; an output vector is y=[η], with η as the thrust coefficient of a rear thruster.

A method for training the artificial neural network is to serve test data obtained from an artificial neural network model test as a training sample {(x(1),y(1)),(x(2),y(2)), . . . , (x(m), y(m))} and optimize the input weight and offset of each layer of neural cells of the artificial neural network through a Back Propagation algorithm to ensure that output of the artificial neural network is close to expected output as far as possible and to achieve the purpose of training.

Step S2: Add the trained artificial neural network into a thrust distribution model to obtain the following model:

$$\min \sum_{i=1}^{8} c_i(\rho, D) \cdot T_i^{\frac{3}{2}}$$

$$\sum_{i=1}^{8} T_i \cdot \cos\alpha_i \cdot \eta_i - F_x = 0$$

$$\sum_{i=1}^{8} T_i \cdot \sin\alpha_i \cdot \eta_i - F_y = 0$$

$$\sum_{i=1}^{8} [T_i \cdot \eta_i (x_i \cdot \sin\alpha_i - y_i \cdot \cos\alpha_i)] - M_z = 0$$

$$T_{min} \leq T_i \leq T_{max}$$

Wherein, $c_i$ is a constant of each azimuth thruster, which is related to fluid density $\rho$ and propeller diameter D, $T_{max}$, $T_{min}$, indicate the upper limit and lower limit of the thrust of each azimuth thruster, and $F_x$, $F_y$, $M_z$ are separately resultant force and resultant moment of all the thrusters in three freedom degree directions which are surging, swaying and yawing directions.

Step S3: Set the resultant force and resultant moment of all the thrusters in the three freedom degree directions which are surging, swaying and yawing directions.

Step S4: Perform thrust distribution iteration algorithm according to a quadratic programming algorithm. Thrust distribution mathematical model is briefly recorded as:

$$\begin{cases} \min f(x) \\ \text{s.t. } h_i(x) = 0, i \in E = \{1, \ldots, l\} \\ g_i(x) \geq 0, i \in I = \{1, \ldots, m\} \end{cases}$$

Wherein, $x=[T_1, T_2, \ldots, T_8, \alpha_1, \alpha_2, \ldots, \alpha_8]$, $\alpha_i$ is the corner of the ith thruster, $i=1,2,\ldots,8$, the set initial value $x_0=[T_1^0, T_2^0, \ldots, T_8^0, \alpha_1^0, \alpha_2^0, \ldots, \alpha_8^0]$, iterative computation is begun, for a certain intermediate value $x_k=[T_1^k, T_2^k, \ldots, T_8^k, \alpha_1^k, \alpha_2^k, \ldots, \alpha_8^k]$ during the iterative process, the corner variable of each thruster is led into the trained artificial neural network, the thrust coefficient $\eta_i^k$ of the ith thruster output by the artificial neural network is obtained and is led into the force distribution model. The thrust distribution model is linearized to obtain a linearly constrained subproblem:

$$\begin{cases} \min \frac{1}{2}d^T B_k d + \nabla f(x_k)^T d \\ \text{s.t. } h_i(x_k) + \nabla h_i(x_k)^T d = 0, i \in E \\ g_i(x_k) + \nabla g_i(x_k)^T d \geq 0, i \in I \end{cases}$$

Wherein, $B_k$ is a symmetric positive matrix computed through WHP Method. A linearly constrained quadratic programming optimization problem is resolved to obtain a descending direction $d_k$ and Step length $\alpha_k$ in the $x_k$ position of an object function, and $x_{k+1}=x_k+\alpha_k d_k$ is updated. If a new solution is smaller than the allowable error, the optimal solution of thrust distribution is obtained. Otherwise, iteration is continued.

The real-time control computer performs thrust distribution iteration computation, to obtain rotate speed and angles of all the thrusters, and the rotate speed and angles are input into rotate speed controllers and angle controllers of the azimuth thrusters, so that thrust required for the positioning of the offshore structure is produced, and positioning effect is realized.

Preferably, the method further comprises the following steps: repeat Step S3 and Step S4 to perform continuous thrust distribution computation.

According to the other aspect of the invention, a dynamic positioning and thrust distribution device based on an artificial neural network is provided, comprises a real-time control computer and several azimuth thrusters which are distributed at the bottom of a buoy of an offshore structure, wherein, propeller rotate speed controllers and full-rotating angle controllers are separately mounted on all the azimuth thrusters, and are connected with the real-time control computer through data lines;

The real-time control computer adopts the dynamic positioning and thrust distribution method based on the artificial neural network to compute the rotate speed and angle of each azimuth thruster, and input the rotate speed and angle into the propeller rotate speed controllers and full-rotating angle controllers to produce the thrust required for the positioning of the offshore structure and realize positioning.

Preferably, several azimuth thrusters are distributed at the front part and the rear part of two buoys at the bottom of the offshore structure. Compared with the prior art, the invention has the following beneficial effect:

The dynamic positioning and thrust distribution device and method based on the artificial neural network, on the one hand, can accurately quantize thrust loss, and on the other hand can enlarge the feasible area of the rotation angle of the thruster, thereby ensuring that more optimized and reasonable result can be obtained for the quadratic programming problem, reducing the power of the thruster and saving energy.

BRIEF DESCRIPTION OF THE SEVERAL VIEWS OF THE DRAWINGS

Through reading and referring of detail description to non-restricted embodiments by the following drawings, other characteristics, purposes and advantages of the invention can become more obvious.

DETAILED DESCRIPTION OF THE INVENTION

Embodiments of the invention are described in details as follows: the embodiments are implemented on the premise of the technical scheme of the invention, and detailed implementation modes and specific operation processes are given. It should be noted that for those of ordinary skill in the art, several variations and improvements can be made on the premise that the conception of the invention is not divorced, and belong to the protection scope of the invention.

Embodiment 1

The embodiment provides a dynamic positioning and thrust distribution method based on an artificial neural network, and comprises the following steps:

Step S1: Establish and train a fitting thrust coefficient of an artificial neural network in a real-time control computer.

Wherein:

The established artificial neural network comprises an input layer, hidden layers and an output layer. An input vector is $x=[\alpha]$, with a as the corner of a front thruster, while an output vector is $y=[\eta]$, with $\eta$ as the thrust coefficient of a rear thruster.

A method for training the artificial neural network is to serve test data obtained from an artificial neural network model test as a training sample $\{(x(1),y(1)),(x(2),y(2)),\ldots,(x(m),y(m))\}$, and optimize the input weight and offset of each layer of neural cells of the artificial neural network through a Back Propagation algorithm, to ensure that output of the artificial neural network is close to expected output as far as possible, and to achieve the purpose of training.

Step S2: Add the trained artificial neural network into a thrust distribution model to obtain the following model:

$$\min \sum_{i=1}^{8} c_i(\rho, D) \cdot T_i^{\frac{3}{2}}$$

-continued $$\sum_{i=1}^{8} T_i \cdot \cos\alpha_i \cdot \eta_i - F_x = 0$$

$$\sum_{i=1}^{8} T_i \cdot \sin\alpha_i \cdot \eta_i - F_y = 0$$

$$\sum_{i=1}^{8} [T_i \cdot \eta_i(x_i \cdot \sin\alpha_i - y_i \cdot \cos\alpha_i)] - M_z = 0$$

$$T_{min} \leq T_i \leq T_{max}$$

Wherein, $c_i$ is a constant of each azimuth thruster, which is related to fluid density $\rho$ and propeller diameter D, $T_{max}$, $T_{min}$ indicate the upper limit and lower limit of the thrust of each azimuth thruster, and $F_x$, $F_y$, $M_z$ are separately resultant force and resultant moment of all the thrusters in three freedom degree directions which are surging, swaying and yawing directions.

Step S3: Set the resultant force and resultant moment of all the thrusters in the three freedom degree directions which are surging, swaying and yawing directions.

Step S4: Perform thrust distribution iteration algorithm according to a quadratic programming algorithm. Thrust distribution mathematical model is briefly recorded as:

$$\begin{cases} \min f(x) \\ \text{s.t.} \ h_i(x) = 0, i \in E = \{1, \ldots, l\} \\ g_i(x) \geq 0, i \in I = \{1, \ldots, m\} \end{cases}$$

Wherein, $x=[T_1, T_2, \ldots, T_8, \alpha_1, \alpha_2, \ldots, \alpha_8]$, $\alpha_i$ is the corner of the ith thruster, $i=1,2,\ldots,8$, the set initial value $x_0=[T_1^0, T_2^0, \ldots, T_8^0, \alpha_1^0, \alpha_2^0, \ldots, \alpha_8^0]$, iterative computation is begun, for a certain intermediate value $x_k=[T_1^k, T_2^k, \ldots, T_8^k, \alpha_1^k, \alpha_2^k, \ldots, \alpha_8^k]$ during the iterative process, the corner variable of each thruster is led into the trained artificial neural network, and the thrust coefficient $\eta_i^k$ of the ith thruster output by the artificial neural network is obtained and is led into the force distribution model. The thrust distribution model is linearized to obtain a linearly constrained subproblem:

$$\begin{cases} \min \frac{1}{2} d^T B_k d + \nabla f(x_k)^T d \\ \text{s.t.} \ h_i(x_k) + \nabla h_i(x_k)^T d = 0, i \in E \\ g_i(x_k) + \nabla g_i(x_k)^T d \geq 0, i \in I \end{cases}$$

Wherein, $B_k$ is a symmetric positive matrix computed through WHP Method. A linearly constrained quadratic programming optimization problem is resolved to obtain a descending direction $d_k$ and Step length $\alpha_k$ in the $x_k$ position of an object function, and $x_{k+1}=x_k+\alpha_k d_k$ is updated. If a new solution is smaller than the allowable error, the optimal solution of thrust distribution is obtained. Otherwise, iteration is continued.

The real-time control computer performs thrust distribution iteration computation to obtain rotate speed and angles of all the thrusters, and the rotate speed and angles are input into rotate speed controllers and angle controllers of the azimuth thrusters, so that thrust required for the positioning of the offshore structure is produced, and positioning effect is realized.

Preferably, the method further comprises the following steps: repeating Step S3 and Step S4 to perform continuous thrust distribution computation.

In order to ensure that technological means, creative features, achieved purposes and efficacies of the embodiment are easy to understand, the embodiment is further illustrated through drawings.

Figure 4:
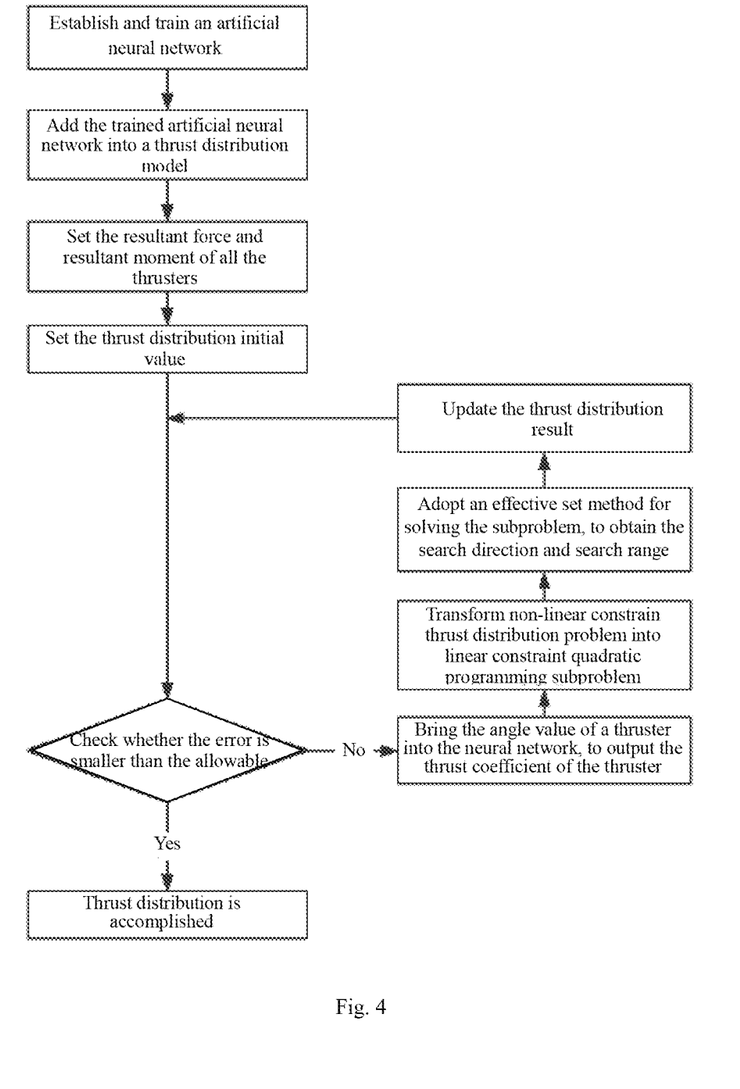
FIG. 4 is a flow diagram of the dynamic positioning and thrust distribution method based on the artificial neural network.

Aiming at the problems of thrust loss of the power positioning system and clamping of the corner of the thruster in the embodiment 1, FIG. 4 shows a flow diagram of the dynamic positioning and thrust distribution method based on the artificial neural network. The method can ensure that the resultant force and resultant moment of eight azimuth thrusters meet the total thrust and torque required by the positioning of a semi-submersible platform, and meanwhile ensures that the rotation angle of a front thruster avoids a prohibited angle area.

Figure 5:
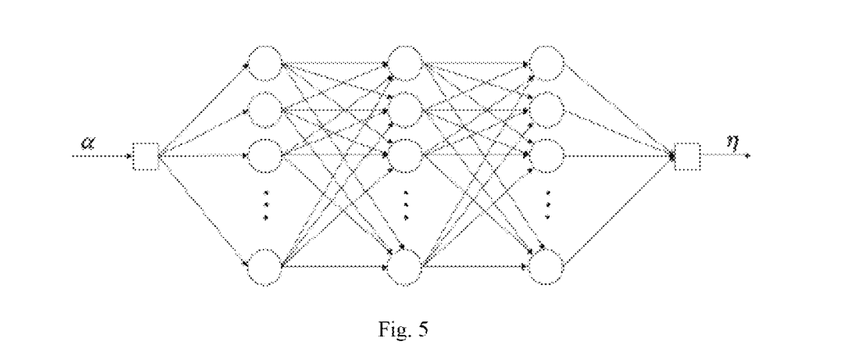
FIG. 5 is a schematic diagram of a neural network for fitting thrust coefficients.

Step 1 is implemented firstly, and a neural network is established and trained in a real-time control computer. The step specifically comprises:

1) establishing the artificial neural network, with the structure as shown in FIG. 5, which comprises an input layer, three hidden layers and an output layer, wherein, the input layer comprises a neural cell node; the first hidden layer comprises 15 neural cell nodes; the second hidden layer comprises 35 neural cell nodes; the third hidden layer comprises 15 neural cell nodes. An input vector is $x=[\alpha]$, with $\alpha$ as the corner of a front thruster while an output vector is $y=[\eta]$, with $\eta$ as the thrust coefficient of a rear thruster.

2) training the artificial neural network, and serving front paddle rotation angle and rear paddle thrust coefficient data obtained through model test as a training sample of the artificial neural network which comprises 360 groups of data $\{(x(1),y(1)),(x(2),y(2)), \ldots, (x(360),y(360))\}$, wherein, each group of data comprises a front paddle angle and a corresponding rear paddle thrust coefficient; optimizing the input weight and offset of each layer of neural cells through a Back Propagation algorithm, to ensure that output of the artificial neural network is close to the expected output as accurate as possible, and to achieve the purpose of training.

Repeat Step 1 for eight times to obtain continuous functions, related to the front paddle rotation angles and rear paddle thrust coefficients, of eight azimuth thrusters of a semi-submersible platform. The functions can be added to a constraint condition of a thrust distribution mathematical model later in this paper.

Step 2: Add the trained artificial neural network into a thrust distribution model to obtain the following model:

$$\min \sum_{i=1}^{8} c_i(\rho, D) \cdot T_i^{\frac{3}{2}}$$

$$\sum_{i=1}^{8} T_i \cdot \cos\alpha_i \cdot \eta_i - F_x = 0$$

$$\sum_{i=1}^{8} T_i \cdot \sin\alpha_i \cdot \eta_i - F_y = 0$$

$$\sum_{i=1}^{8} [T_i \cdot \eta_i(x_i \cdot \sin\alpha_i - y_i \cdot \cos\alpha_i)] - M_z = 0$$

$$T_{min} \leq T_i \leq T_{max}$$

Wherein, $c_i$ is a constant of each azimuth thruster, which is related to fluid density ρ and propeller diameter D, exemplarily $c_i$=1, i=1,2, . . . , 8,$T_{max}$, $T_{min}$ indicate the upper limit and lower limit of the thrust of each azimuth thruster, exemplarily $T_{max}$=800, $T_{min}$=50, $F_x$, $F_y$, $M_z$ are separately resultant force and resultant moment of all the thrusters in three freedom degree directions which are surging, swaying and yawing directions, and the specific values are set in Step 3 later in this paper.

Step 1 and Step 2 are preparation steps for thrust distribution computation, and are required to be accomplished before thrust distribution computation. Step 1 and Step 2 are required to be accomplished one time and are not required to be repeated, and memory repetition is used for thrust distribution computation.

Step 3: Set the resultant force and resultant moment of all the thrusters in the three freedom degree directions which are surging, swaying and yawing directions. Exemplarily, $F_x$=1000, $F_y$=−344, $M_z$=−10000 are set.

Step 4: Perform thrust distribution iteration algorithm according to a quadratic programming algorithm. Firstly an initial value $x_0$=[50, 50, 50, 50, 50, 50, 50, 50, 0, 0, 0, 0, 0, 0, 0, 0] is given. Corner values $\alpha_i$ of eight thrusters are respectively led into the artificial neural network of each thruster to obtain the thrust loss coefficients of the eight thrusters. Exemplarily, for $\alpha_1=\alpha_2=$ . . . $=\alpha_8=0$, thrust coefficients output through the artificial neural network $\eta_1=\eta_2=$ . . . $=\eta_8=1$. The thrust coefficients are led into the thrust distribution model, and the thrust distribution model is linearized to obtain a linearly constrained subproblem:

$$\begin{cases} \min \frac{1}{2}d^T B_k d + \nabla f(x_k)^T d \\ \text{s.t.} \quad h_i(x_k) + \nabla h_i(x_k)^T d = 0, i \in E \\ \quad g_i(x_k) + \nabla g_i(x_k)^T d \geq 0, i \in I \end{cases}$$

Figure 6:
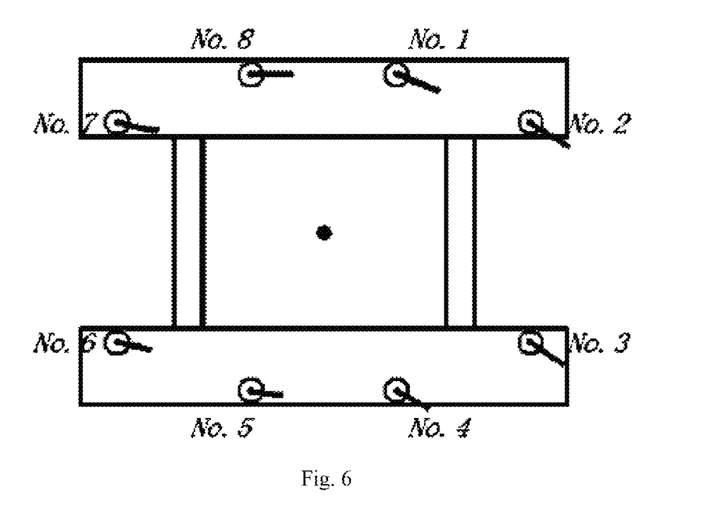
FIG. 6 is a schematic diagram of thrust distribution results.

Wherein, $B_k$ is a symmetric positive matrix (Schittkowski K. The nonlinear programming method of Wilson, Han, and Powell with an augmented Lagrangian type line search function[J]. Numerische Mathematik, 1982, 38(1):115-127.) computed through a WHP method. A linearly constrained quadratic programming optimization problem is resolved, and an effective set method is used for solving (Shanno D F. Numerical Optimization by Jorge Nocedal; Stephen J. Wright[J]. Siam Review, 2001, 43(3):572-574.) to obtain a descending direction $d_k$ and Step length $\alpha_k$ in the $x_k$ position of an object function, and $x_{k+1}=x_k+\alpha_k d_k$ is updated. If a new solution is smaller than the allowable error, the optimal solution of thrust distribution is obtained. Otherwise, the angle of a thruster in $x_{k+1}$ is led into the artificial neural network to obtain the thrust loss value $\eta_i$(i=1,2, . . . , 8). The value is led into a linearly constrained subproblem, and iteration is continued till the optimal solution is obtained. For set $f_x$=1000, $F_y$=−344, $M_z$=−10000, the optimal solution of thrust distribution x=[162.66, 153.64, 136.74, 116.73, 103.07, 107.24, 142.96, 155.25, −23.2, −9.0, −41.3, −32.3, −9.0, −10.4, −8.9, −17.0] is obtained. The thrust distribution angle and thrust are as shown in FIG. 6. The circle in the FIG. 6 indicates a thruster, the line segment taking the circle center as a starting point indicates thrust, the direction of the line segment is the thrust direction, and the size of the line segment indicates the size of thrust.

The real-time control computer performs thrust distribution method computation, to obtain rotate speed and angles of all the thrusters, and the rotate speed and angles are input into rotate speed controllers and angle controllers of the azimuth thrusters, so that thrust required for the positioning of the offshore structure is produced, and positioning effect is realized.

Embodiment 2

The embodiment provides a dynamic positioning and thrust distribution device based on an artificial neural network, comprises a real-time control computer and several azimuth thrusters which are distributed at the bottom of a buoy of an offshore structure, wherein, propeller rotate speed controllers and full-rotating angle controllers are separately mounted on all the azimuth thrusters, and are connected with the real-time control computer through data lines;

The real-time control computer adopts the dynamic positioning and thrust distribution method, based on the artificial neural network, provided by the embodiment 1 to compute the rotate speed and angle of each azimuth thruster, and input the rotate speed and angle into the propeller rotate speed controllers and full-rotating angle controllers to produce the thrust required for the positioning of the offshore structure and realize positioning.

Preferably, several azimuth thrusters are distributed at the front part and the rear part of two buoys at the bottom of the offshore structure.

In order to ensure that technological means, creative features, achieved purposes and efficacies of the embodiment are easy to understand, the embodiment is further illustrated through drawings.

Figure 1:
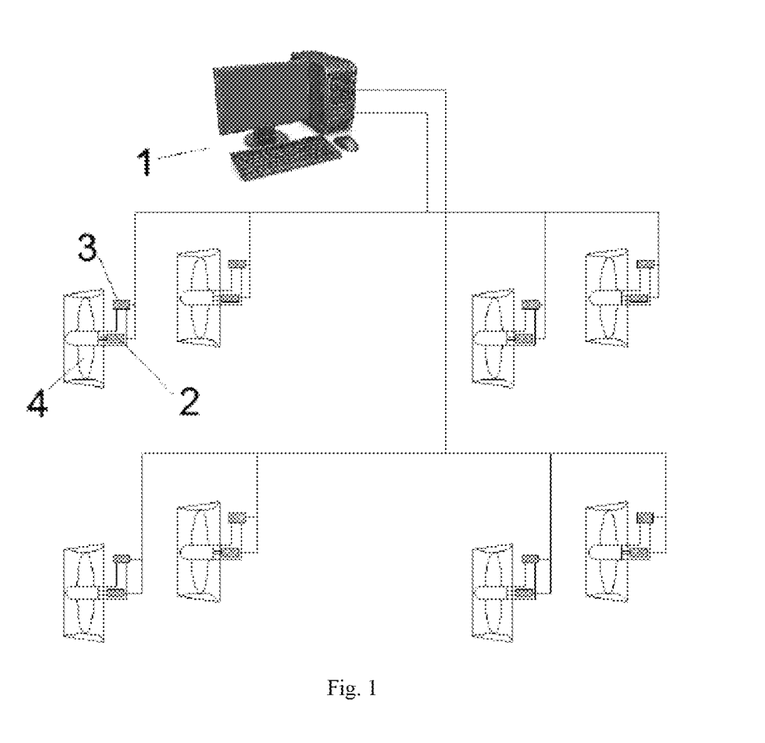
FIG. 1 is structure diagram of the dynamic positioning and thrust distribution device based on the artificial neural network.
Figure 2:
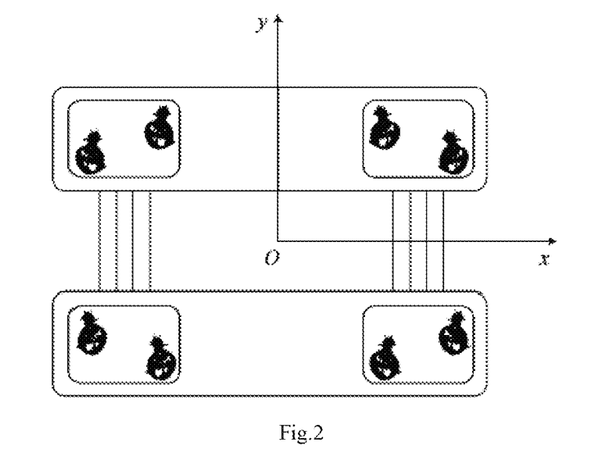
FIG. 2 is a distribution diagram of a semi-submersible ocean platform thruster provided with the invention.
Figure 3:
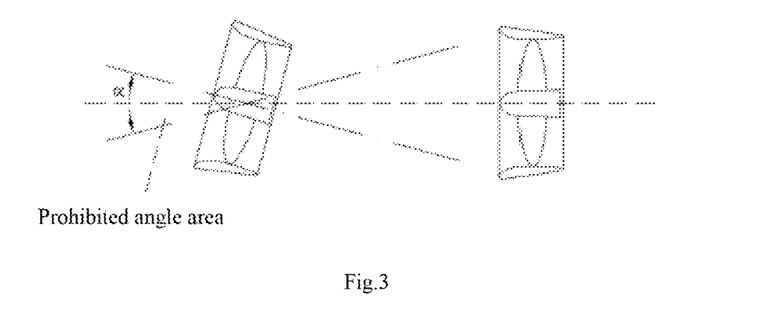
FIG. 3 is a schematic diagram of a prohibited angle.

FIG. 1 is a structure diagram of the dynamic positioning and thrust distribution device based on the artificial neural network, as shown in the FIG. 1, a schematic diagram of the dynamic positioning and thrust distribution device, based on the artificial neural network, comprises a real-time control computer 1 and several azimuth thrusters 4 which are distributed at the bottom of a buoy of an offshore structure, wherein, propeller rotate speed controllers 2 and full-rotating angle controllers 3 are separately mounted on all the azimuth thrusters 4, and are connected with the real-time control computer through data lines FIG. 2 is a distribution diagram of a semi-submersible offshore platform thruster provided with the invention, which comprises 8 azimuth thrusters. Each two thrusters which are close to each other form one group. When the angle of a front thruster (hereinafter referred to as front paddle) in one group of thrusters reaches certain positions, as shown in FIG. 3, the tail flow produces large water power interference on a rear thruster (hereinafter referred to as a rear paddle), so that thrust loss of the rear paddle is caused. In practical engineering application, through arrangement of an inhibited angle, the rotation angle of the front paddle can avoid the thrust loss area of the rear paddle. However, as the inhibited angle exists, the thruster cannot penetrate through the prohibited angle during rotation, so that the angle of the thruster is kept at the edge of the prohibited angle, and the phenomenon of clamping of the corner of the thruster is avoided. The optimal solution of thrust distribution cannot be obtained, the total power of the thruster cannot realize minimization, and energy waste is caused. The real-time control computer adopts the dynamic positioning and thrust distribution method, based on the artificial neural network, provided by the embodiment 1 to compute the rotate speed and angle of each azimuth thruster, and input the rotate speed and angle into the propeller rotate speed controllers and full-rotating angle controllers to produce the thrust required for the positioning of the offshore structure and realize positioning.

The two embodiments of the invention provide a dynamic positioning and thrust distribution device and method of an offshore structure, based on an artificial neural network for computing thrust loss. The thrust distribution method is a quadratic programming problem in the optimization problem, and can compute the thrust coefficient of the rear thruster in the constraint condition of thrust distribution problem by taking into account of the corner of the front thruster and through the artificial neural network. Then the optimization problem enabling the power of the thruster to be minimized is solved according to a sequential quadratic programming algorithm, so that a thrust distribution scheme on the azimuth thrusters is obtained. The thrust distribution device adopts the thrust distribution method to compute the rotate speed and angle of each azimuth thruster, and input the rotate speed and angle into the propeller rotate speed controllers and full-rotating angle controllers to produce the thrust required for the positioning of the offshore structure and realize positioning. The two embodiments of the invention, through the introduction of the concept of thrust coefficients, the invention, on the one hand, can accurately quantize thrust loss, and on the other hand can enlarge the feasible area of the rotation angle of the thruster, thereby ensuring that the more optimized and reasonable result can be obtained for the quadratic programming problem, reducing the power of the thruster and saving energy.

The aforementioned contents display and describe the basic principle, main characteristics and advantages of the invention. Those skilled in the art can understand that the invention is not limited by the aforementioned examples, the aforementioned examples and contents in the specifications only indicate the principle of the invention, the invention can have various variations and improvements on the promise that the spirit and scope of the invention are not divorced, and the variations and improvements are included in the scope of the invention, which is required to be protected.

What is claimed is:

1. A dynamic positioning and thrust distribution method based on an artificial neural network, characterized by comprising the following steps:

Step S1: Establish and train a fitting thrust coefficient of an artificial neural network in a real-time control computer;

Step S2: Add the trained artificial neural network into a thrust distribution model to obtain the following model:

$$\min \sum_{i=1}^{8} c_i(\rho, D) \cdot T_i^{\frac{3}{2}}$$

$$\sum_{i=1}^{8} T_i \cdot \cos\alpha_i \cdot \eta_i - F_x = 0$$

$$\sum_{i=1}^{8} T_i \cdot \sin\alpha_i \cdot \eta_i - F_y = 0$$

$$\sum_{i=1}^{8} [T_i \cdot \eta_i (x_i \cdot \sin\alpha_i - y_i \cdot \cos\alpha_i)] - M_z = 0$$

$$T_{min} \leq T_i \leq T_{max}$$

Wherein, $c_i$, is a constant of each azimuth thruster, which is related to fluid density p and propeller diameter D, $T_{max}$, $T_{min}$ respectively indicate the upper limit and lower limit of the thrust of each azimuth thruster, and $F_x, F_y, M_z$ are separately resultant force and resultant moment of all the thrusters in three freedom degree directions which are surging, swaying and yawing directions;

Step S3: Set the resultant force and resultant moment of all the thrusters in the three freedom degree directions which are surging, swaying and yawing directions;

Step S4: Perform thrust distribution iteration algorithm according to a quadratic programming algorithm, Thrust distribution mathematical model is briefly recorded as:

$$\begin{cases} \min f(x) \\ \text{s.t.} \ h_i(x) = 0, \ i \in E = \{1, \ldots, l\} \\ g_i(x) \geq 0, \ i \in I = \{1, \ldots, m\} \end{cases}$$

Wherein, $x=[T_1, T_2, \ldots, T_8, \alpha_1, \alpha_2, \ldots, \alpha_8], \alpha_i$ is the corner of the ith thruster, i=1,2, . . . , 8, the set initial value $x_0=[\ T_1^0, T_2^0, \ldots, T_8^0, \alpha_1^0, \alpha_2^0, \ldots, \alpha_8^0]$, iterative computation is begun, for a certain intermediate value $x_k=[T_1^k, T_2^k, \ldots, T_8^k, \alpha_1^k, \alpha_2^k, \ldots, \alpha_8^k]$ during the iterative process, the corner variable of each thruster is led into the trained artificial neural network, the thrust coefficient $\eta_i^k$ of the ith thruster output by the artificial neural network is obtained and is led into the force distribution model; The thrust distribution model is linearized to obtain a linearly constrained subproblem:

$$\begin{cases} \min \frac{1}{2} d^T B_k d + \nabla f(x_k)^T d \\ \text{s.t.} \ h_i(x_k) + \nabla h_i(x_k)^T d = 0, \ i \in E \\ g_i(x_k) + \nabla g_i(x_k)^T d \geq 0, \ i \in I \end{cases}$$

Wherein, $B_k$ is a symmetric positive matrix computed through a WHP method (Wilson-Han-Powell method), and the method is a classical algorithm adopted in thrust distribution algorithms; a linearly constrained quadratic programming optimization problem is resolved through an effective set method, and the method is a classical algorithm adopted in thrust distribution algorithms to obtain a descending direction $d_k$ and Step length $\alpha_k$ in the $x_k$ position of an object function, and $x_{k+1}=x_k+\alpha_k d_k$ is updated; if a new solution is smaller than the allowable error, the optimal solution of thrust distribution is obtained, Otherwise, iteration is continued;

The real-time control computer performs to thrust distribution iteration computation, to obtain rotate speed and angles of all the thrusters, and the rotate speed and angles are input into rotate speed controllers and angle controllers of the azimuth thrusters, so that thrust required for the positioning of the offshore structure is produced, and positioning effect is realized.

2. A dynamic positioning and thrust distribution method, based on an artificial neural network, according to claim 1, characterized in that in Step S1, the established artificial neural network comprises an input layer, hidden layers and an output layer, an input vector is =[α], with α as the corner of a front thruster; an output vector is y=[η], with η as the thrust coefficient of a rear thruster.

3. A dynamic positioning and thrust distribution method, based on an artificial neural network, according to claim 1, characterized in that in Step S1, a method for training the artificial neural network is to serve test data obtained from an artificial neural network model test as a training sample {(x(1),y(1)),(x(2),y(2)), ..., (x(m), y(m))}, and optimize the input weight and offset of each layer of neural cells of the artificial neural network through a Back Propagation algorithm, to ensure that output of the artificial neural network is close to expected output as far as possible, and to achieve the purpose of training.

4. A dynamic positioning and thrust distribution method, based on an artificial neural network, according to claim 1, characterized by further comprising the following steps:
Repeat Step 3 and Step 4; Perform continuous thrust distribution computation.

5. A dynamic positioning and thrust distribution device, based on an artificial neural network, characterized by comprising a real-time control computer (1) and several azimuth thrusters (4) which are distributed at the bottom of an offshore structure, wherein, a propeller rotate speed controller (2) and a full-rotating angle controller (3) are respectively mounted on each azimuth thruster (4), and are respectively connected with the real-time control computer (1) through data lines;
the real-time control computer adopts the dynamic positioning and thrust distribution method based on the artificial neural network according to claim 1 to compute the rotate speed and angle of each azimuth thruster (4), and input the rotate speed and angle into the propeller rotate speed controllers (2) and full-rotating angle controllers (3) to produce the thrust required for the positioning of the offshore structure and realize positioning.

6. A dynamic positioning and thrust distribution device, based on an artificial neural network, according to claim 5, characterized in that the azimuth thrusters (4) are distributed at the front part and/or the rear part of two buoys at the bottom of the offshore structure.

* * * * *